(12) United States Patent
Liu et al.

(10) Patent No.: US 11,706,862 B2
(45) Date of Patent: Jul. 18, 2023

(54) LIGHTING APPARATUS

(71) Applicant: LEEDARSON LIGHTING CO., LTD., Fujian (CN)

(72) Inventors: Zongyuan Liu, Fujian (CN); Yankun Li, Fujian (CN); Yibin Chen, Fujian (CN); Hemu Ye, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 17/541,902

(22) Filed: Dec. 3, 2021

(65) Prior Publication Data

US 2022/0183131 A1 Jun. 9, 2022

(30) Foreign Application Priority Data

Dec. 3, 2020 (CN) .......................... 202011400185.7

(51) Int. Cl.
*H05B 47/165* (2020.01)
*H02J 50/10* (2016.01)
*H05B 47/17* (2020.01)

(52) U.S. Cl.
CPC ............ *H05B 47/165* (2020.01); *H02J 50/10* (2016.02); *H05B 47/17* (2020.01)

(58) Field of Classification Search
CPC .... H05B 47/165; H05B 47/17; H05B 47/115; H05B 47/19; H05B 45/10; H05B 45/12; H05B 45/20; H05B 45/22
See application file for complete search history.

(56) References Cited

U.S. PATENT DOCUMENTS

| | | | |
|---|---|---|---|
| 2015/0351203 A1* | 12/2015 | Shen | G08C 17/02 315/294 |
| 2019/0069375 A1* | 2/2019 | Baker | H04N 21/43635 |

* cited by examiner

*Primary Examiner* — Daniel D Chang
(74) *Attorney, Agent, or Firm* — Chun-Ming Shih; Lanway IPR Services (57) ABSTRACT

A lighting apparatus includes a main module and an extended module. The main module includes a power circuit, a light source, a first network interface and a controller. The power circuit is controlled by the controller to generate a driving current supplied to the light source by converting an external power source. The extended module includes a function circuit and a second network interface. The function circuit communicates with the controller via the second network interface and the first network interface to add an extended function for the controller to enhance controlling of the light source. When the extended module is detachable from the main module, the main module is operated independently without the extended function.

19 Claims, 8 Drawing Sheets

LIGHTING APPARATUS

FIELD

The present invention is related to a lighting apparatus, and more particularly related to a lighting apparatus with a flexible control.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to have a flexible control for electronic devices. Even light devices need more functions to be selected for some people.

Meanwhile, some other people may expect light devices to be ordinary without additional functions. In such case, it is important to find a balance between different needs while keeping the design simpler with lower manufacturing cost.

SUMMARY

In some embodiments, a lighting apparatus includes a main module and an extended module.

The main module includes a power circuit, a light source, a first network interface and a controller.

The power circuit is controlled by the controller to generate a driving current supplied to the light source by converting an external power source.

The extended module includes a function circuit and a second network interface.

The function circuit communicates with the controller via the second network interface and the first network interface to add an extended function for the controller to enhance controlling of the light source.

When the extended module is detachable from the main module, the main module is operated independently without the extended function.

In some embodiments, the main module and the extended module share a common housing.

In some embodiments, the main module has a main housing and the extended module has a extended housing.

The main housing and the extended housing are detachable.

The main housing and the extended housing do not have metal contact.

In some embodiments, the main housing is attached to the extended housing with a connector structure.

In some embodiments, the first network interface has a first wireless charging circuit for providing electricity to the function circuit via a corresponding second wireless charging circuit of the second network interface.

In some embodiments, the first wireless charging circuit and the second wireless charging circuit respectively comprise coils for transmitting power and control signals between the controller and the function circuit.

In some embodiments, the main module and the extended module are attached with a magnetic unit for aligning the coils of the main module and the extended module.

In some embodiments, the function circuit has a third network interface.

The controller is connected to an external device wirelessly via the third network interface to receive a control signal from the external device.

The third network interface accesses a different network protocol as the first network interface.

In some embodiments, the controller transmits a connection parameter to the function circuit via the first network interface and the second network interface for the function circuit to communicate with the external device.

In some embodiments, the function circuit transmits a connection parameter to the controller via the second network interface and the first network interface for the controller to communicate with the external device.

In some embodiments, the function circuit has a sensor for detecting a motion.

The detected motion is sent to the controller to control the light source.

In some embodiments, the extended module has a fourth network interface for physically connecting to a second device.

The controller communicates with the second device via the fourth network interface.

In some embodiments, the function circuit includes a light unit.

The controller controls the light unit via the first network interface and the second network interface.

In some embodiments, the controller retrieves a light parameter of the light unit.

The controller controls both the light source and the light unit to generate a mixed light with a mixed light parameter.

In some embodiments, the function unit stores a control program.

When the main module is attached to the extended module, the control program is transmitted to controller for the controller to execute the control program.

In some embodiments, the controller stores a control program.

When the main module is attached to the extended module, the control program is transmitted to the function circuit for the function circuit to execute the control program.

In some embodiments, the controller has a translator for translating a control code of a control code set from the function circuit into a control signal for controlling the power circuit.

The extended module is detachable and is capable of being replaced with another extended module with a different type of the function circuit.

The function circuit and the different type of the function circuit share the same control code set.

In some embodiments, the function circuit generates the control code from a raw signal using the control code set.

In some embodiments, there are multiple extended modules attached to the main module at the same time.

The function circuits of the multiple extended module provide different functions.

In some embodiments, the controller dynamically detects the multiple extended modules and dynamically adjust controlling of the light source according to detected multiple extended modules.

DETAILED DESCRIPTION

Figure 1:
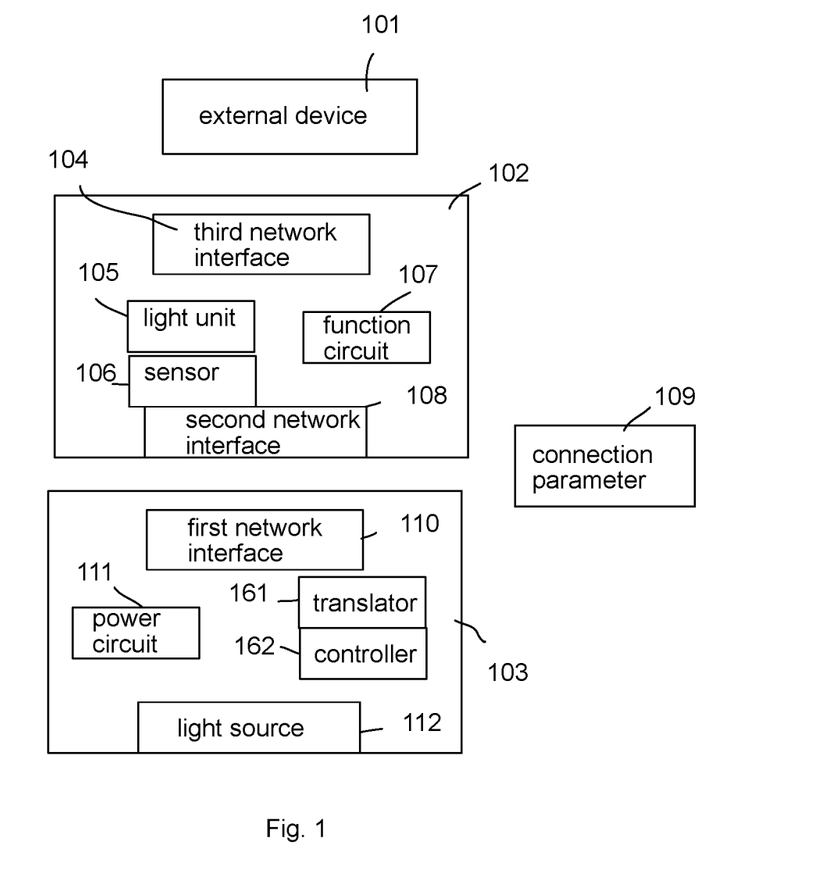
FIG. 1 illustrates a lighting apparatus embodiment.

In FIG. 1, a lighting apparatus includes a main module 103 and an extended module 102.

The main module 103 includes a power circuit 111, a light source 112, a first network interface 110 and a controller 162.

The power circuit 111 is controlled by the controller 162 to generate a driving current supplied to the light source 112 by converting an external power source.

For example, the external power source may be a 110V AC power source. The 110V AC power source is converted to a DC power with a rectifier, a transformer and/or filters. A current source circuit may be shared by multiple types of LED modules of the light source. By controlling a ration among driving currents supplied to the multiple types of LED modules, a desired mixed light is obtained.

The extended module 102 includes a function circuit 107 and a second network interface 108.

The first network interface 110 is corresponding to the second network interface 108. For example, the first network interface 110 is operated at a same range of frequency as the second network interface 108. A common network protocol is achieved in the first network interface 108 and the second network interface 110.

The function circuit 107 communicates with the controller 162 via the second network interface 108 and the first network interface 110 to add an extended function for the controller to enhance controlling of the light source 112.

For example, the function circuit 107 may add computation power, a sensor, another light source or other components to increase function of the lighting apparatus.

When the extended module is detachable from the main module, the main module is operated independently without the extended function.

In other words, even the extended module is not used, the main module itself may be operated normally, e.g. as a lighting apparatus to be paired with a wall switch or other control methods.

Figure 6:
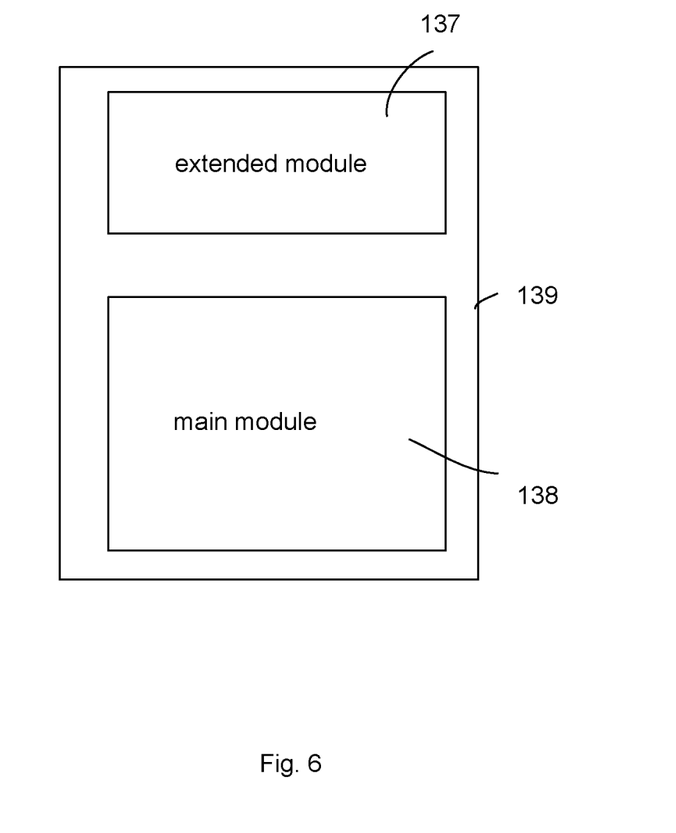
FIG. 6 illustrates sharing of a common housing by the main module and the extended module.

In FIG. 6, the main module 138 and the extended module 137 share a common housing 139. For example, the common housing 139 may include one or multiple slots for inserting the extended module 137.

Figure 7:
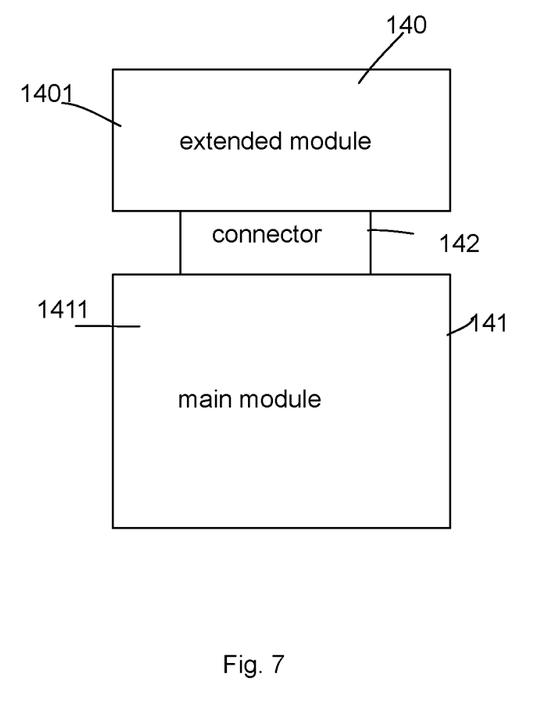
FIG. 7 illustrates a connector is used for connecting the main module and the extended module without metal contact.

In FIG. 7, the main module 141 has a main housing 1411 and the extended module 140 has an extended housing 1401.

The main housing 1411 and the extended housing 1401 are detachable.

The main housing 1411 and the extended housing 1401 do not have metal contact. Specifically, the main housing 1411 encloses electronic components like the controller mentioned above. There is no physical metal contact between the main module and the extended module. A wireless charging and signal exchange are used between the main module and the extended module.

In some embodiments, the main housing 1411 is attached to the extended housing 1401 with a connector structure 142.

Figure 5:
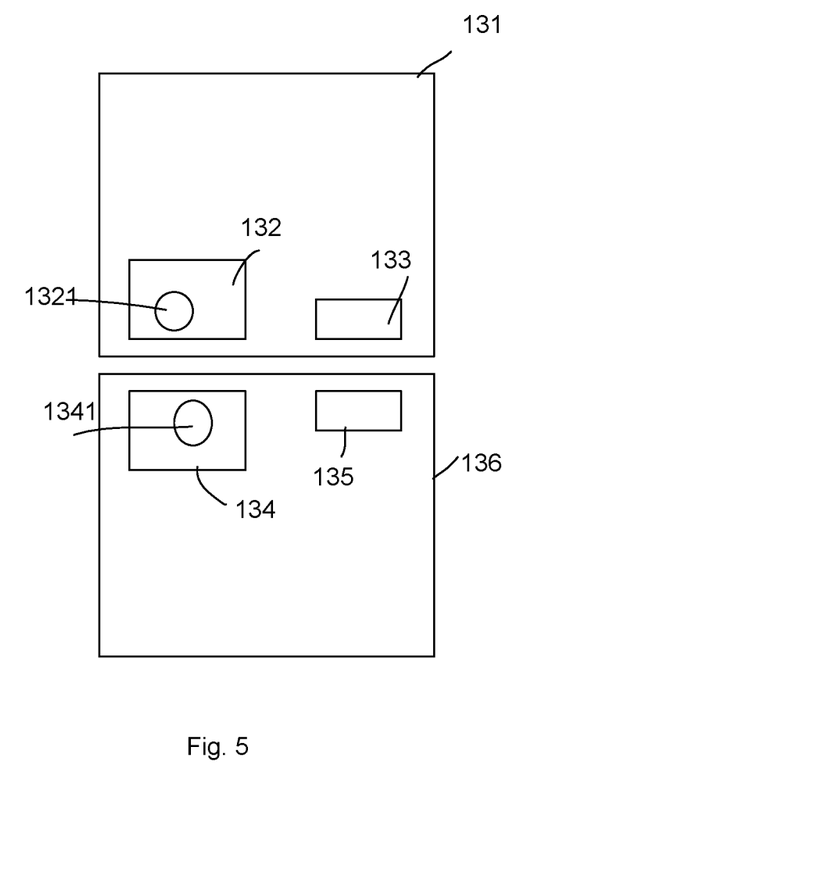
FIG. 5 illustrates network interfaces with coils and magnet units.

In FIG. 5, the first network interface has a first wireless charging circuit 134 for providing electricity to the function circuit via a corresponding second wireless charging circuit 132 of the second network interface.

In some embodiments, the first wireless charging circuit 134 and the second wireless charging circuit 132 respectively comprise coils 1341, 1321 for transmitting power and control signals between the controller and the function circuit.

In some embodiments, the main module and the extended module are attached with a magnetic unit 133, 135 for aligning the coils 1341, 1321 of the main module 136 and the extended module 131.

In FIG. 1, the function circuit has a third network interface 104.

The controller 162 is connected to an external device 101 wirelessly via the third network interface 104 to receive a control signal from the external device 101.

For example, the external device 101 may be a wireless wall switch, a remote control, a mobile phone installed with a corresponding app.

The third network interface 104 accesses a different network protocol as the first network interface 110. For example, the third network interface 104 implements Wi-Fi, Bluetooth or other wireless protocols, while the first network interface 110 communicates with the second network interface 108 with a different wireless protocol In some embodiments, the controller 162 transmits a connection parameter 109 to the function circuit 107 via the first network interface 110 and the second network interface 108 for the function circuit 107 to communicate with the external device 101. For example, the connection parameter may include id and password for connecting to a hot spot.

In some embodiments, the function circuit 107 transmits a connection parameter 109 to the controller 162 via the second network interface 108 and the first network interface 110 for the controller 162 to communicate with the external device 101. For example, the main module 103 has another network interface. The main module 103 receives the necessary password for connecting to the external device 101.

In some embodiments, the function circuit has a sensor 106 for detecting a motion. For example, the sensor 106 may be an infrared or a microwave motion sensor. When a person approaches or leaves a predetermined scope, the controller 162 changes a behavior of the light source 112, e.g. turn on/off, changing light intensity.

The detected motion is sent to the controller to control the light source.

Figure 2:
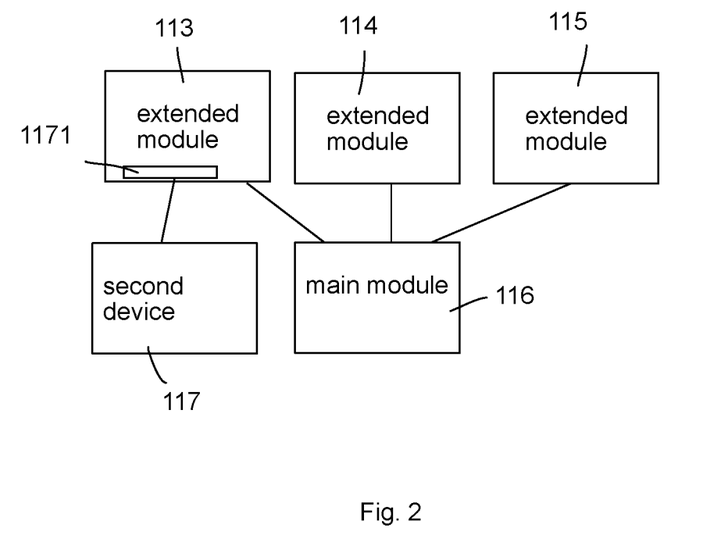
FIG. 2 illustrates a connection example of multiple extended modules and a second device.

In FIG. 2, the extended module 113 has a fourth network interface 1171 for physically connecting to a second device 117. For example, the second device 117 is another lighting apparatus with the same structure as the original lighting apparatus. The two lighting apparatuses share one extended module and use the shared extended module to communicate and to work together.

The controller communicates with the second device via the fourth network interface.

In FIG. 1, the function circuit 107 includes a light unit 105.

The controller 162 controls the light unit via the first network interface 110 and the second network interface 108.

In some embodiments, the controller 162 retrieves a light parameter of the light unit 105. For example, the light parameter is encoded and sent to the controller 162 so that the controller realizes how to control the light unit 105 in the extended module 102.

The controller 162 controls both the light source 112 and the light unit 105 to generate a mixed light with a mixed light parameter, e.g. with desired color temperature, color or light intensity.

Figure 3A:
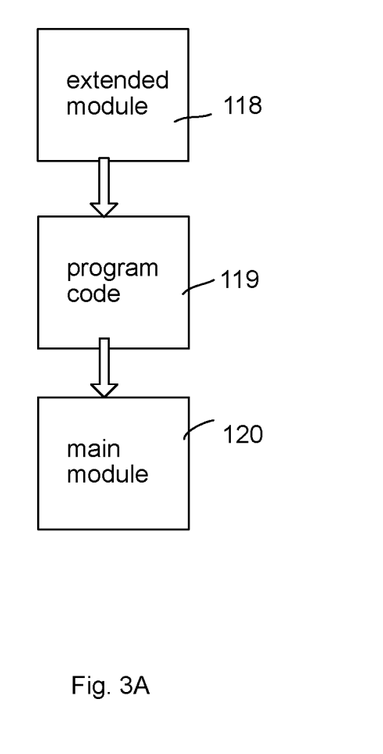
FIG. 3A illustrates a first way to transmit program code between the main module and the extended module.

In FIG. 3A, the function unit stores a control program 119.

When the main module is attached to the extended module, the control program 119 is transmitted to the controller of the main module from the extended module 118 for the controller to execute the control program. For example, the program code 119 is received by the extended module 118 via a Wi-Fi network.

The program code refers to a series of instructions for indicating how the controller to work. With such design, the behavior of the controller may be changed conveniently.

Figure 3B:
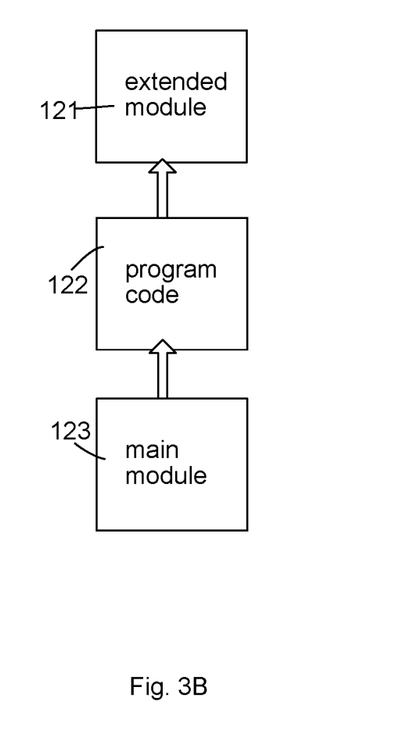
FIG. 3B illustrates a second way to transmit program code between the main module and the extended module.

In FIG. 3B, the controller of the main module 123 stores a control program 122.

When the main module 123 is attached to the extended module 121, the control program 122 is transmitted to the function circuit for the function circuit to execute the control program.

In such case, the function circuit may include a processor for executing the program code 122 received from the main module 123.

Figure 4:
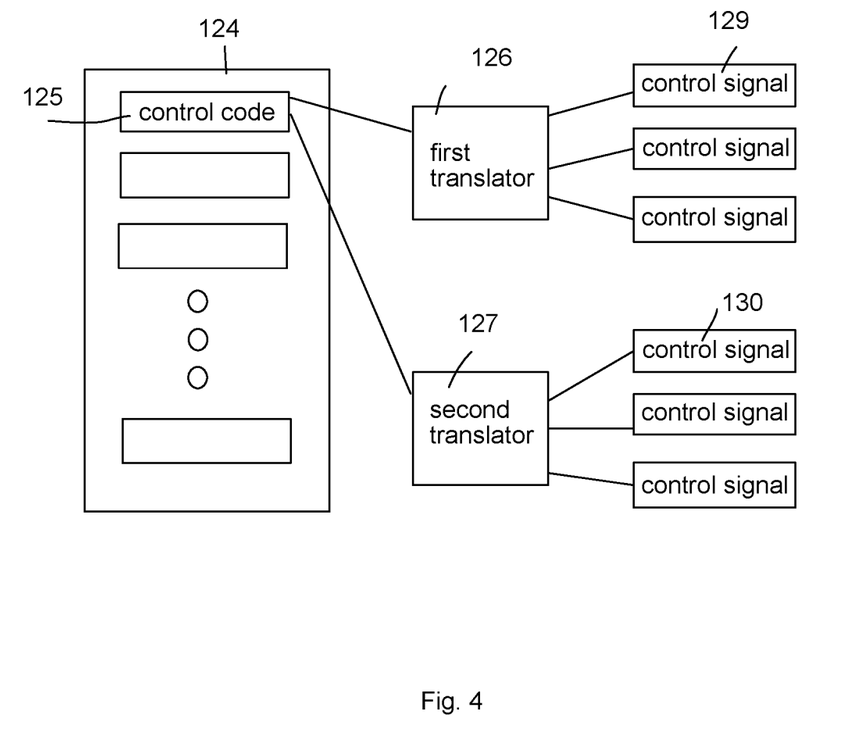
FIG. 4 illustrates a translation of control code and control signals.

In FIG. 4, the controller has a translator 126 for translating a control code 125 of a control code set 124 from the function circuit into a control signal 129 for controlling the power circuit.

For example, a control code "Open Light" is associated with multiple control signals 129 to be used by the controller of the main module.

The extended module is detachable and is capable of being replaced with another extended module with a different type of the function circuit.

The function circuit and the different type of the function circuit share the same control code set 124.

With such design, the main module knows the language of multiple different extended modules. The language includes the control code set. The mapping may be implemented by the controller that has a first translator 126.

In some embodiments, the function circuit generates the control code from a raw signal using the control code set.

For example, multiple control signals 130 are encoded by the second translator to a corresponding control code 125. The control signals 130 may include detected sensor data or other parameters.

In FIG. 2, there are multiple extended modules 113, 114, 115 attached to the main module 116 at the same time.

The function circuits of the multiple extended modules 113, 114, 115 provide different functions.

In some embodiments, the controller of the main module 116 dynamically detects the multiple extended modules 113, 114, 115 and dynamically adjust controlling of the light source according to detected multiple extended modules.

In addition to lighting devices, the invention may be applied to other devices.

Figure 8:
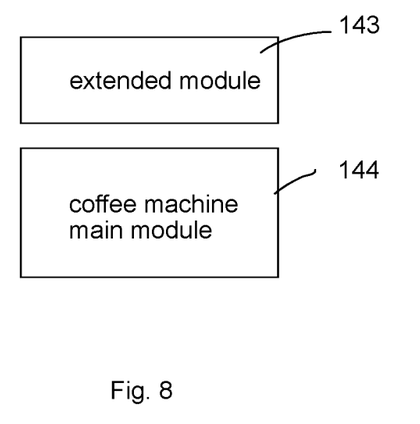
FIG. 8 shows another example of using a main module and an extended module in a coffee machine.

In FIG. 8, a coffee machine example is provided. An extended module 143 may be provided by a coffee farmer. The extended module 143 may include various formula for making a nice coffee. The extended module 143 is attached to a coffee machine main module 144 for enhancing the quality of the coffee machine. Even the extended module 143 is not attached, users may use default parameters for making the coffee.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
  a main module comprising a power circuit, a light source, a first network interface and a controller, wherein the power circuit is controlled by the controller to generate a driving current supplied to the light source by converting an external power source; and
  an extended module comprising a function circuit and a second network interface, wherein the function circuit communicates with the controller via the second network interface and the first network interface to add an extended function for the controller to enhance controlling of the light source, wherein when the extended module is detachable from the main module, the main module is operated independently without the extended function, wherein the function circuit comprises a light unit, wherein the controller controls the light unit via the first network interface and the second network interface.

2. The lighting apparatus of claim 1, wherein the main module and the extended module share a common housing.

3. The lighting apparatus of claim 1, wherein the main module has a main housing and the extended module has a extended housing, wherein the main housing and the extended housing are detachable, wherein the main housing and the extended housing do not have metal contact.

4. The lighting apparatus of claim 3, wherein the main housing is attached to the extended housing with a connector structure.

5. The lighting apparatus of claim 1, wherein the first network interface has a first wireless charging circuit for providing electricity to the function circuit via a corresponding second wireless charging circuit of the second network interface.

6. The lighting apparatus of claim 5, wherein the first wireless charging circuit and the second wireless charging circuit respectively comprise coils for transmitting power and control signals between the controller and the function circuit.

7. The lighting apparatus of claim 6, wherein the main module and the extended module are attached with a magnetic unit for aligning the coils of the main module and the extended module.

8. The lighting apparatus of claim 1, wherein the function circuit has a third network interface, wherein the controller is connected to an external device wirelessly via the third network interface to receive a control signal from the external device, wherein the third network interface accesses a different network protocol as the first network interface.

9. The lighting apparatus of claim 8, wherein the controller transmits a connection parameter to the function circuit via the first network interface and the second network interface for the function circuit to communicate with the external device.

10. The lighting apparatus of claim 8, wherein the function circuit transmits a connection parameter to the controller via the second network interface and the first network interface for the controller to communicate with the external device.

11. The lighting apparatus of claim 1, wherein the function circuit has a sensor for detecting a motion, wherein the detected motion is sent to the controller to control the light source.

12. The lighting apparatus of claim 1, wherein the extended module has a fourth network interface for physically connecting to a second device, wherein the controller communicates with the second device via the fourth network interface.

13. The lighting apparatus of claim 1, wherein the controller retrieves a light parameter of the light unit, wherein the controller controls both the light source and the light unit to generate a mixed light with a mixed light parameter.

14. The lighting apparatus of claim 1, wherein the function circuit stores a control program, wherein when the main module is attached to the extended module, the control program is transmitted to the controller for the controller to execute the control program.

15. The lighting apparatus of claim 1, wherein the controller stores a control program, wherein when the main module is attached to the extended module, the control program is transmitted to the function circuit for the function circuit to execute the control program.

16. The lighting apparatus of claim 1, wherein the controller has a translator for translating a control code of a control code set from the function circuit into a control signal for controlling the power circuit, wherein the extended module is detachable and is capable of being replaced with another extended module with a different type of the function circuit, wherein the function circuit and the different type of the function circuit share the same control code set.

17. The lighting apparatus of claim 16, wherein the function circuit generates the control code from a raw signal using the control code set.

18. The lighting apparatus of claim 1, wherein there are multiple extended modules attached to the main module at the same time, wherein the function circuits of the multiple extended module provide different functions.

19. The lighting apparatus of claim 18, wherein the controller dynamically detects the multiple extended modules and dynamically adjust controlling of the light source according to detected multiple extended modules.

* * * * *